United States Patent
McNairy et al.

(10) Patent No.: US 9,495,233 B2
(45) Date of Patent: Nov. 15, 2016

(54) ERROR FRAMEWORK FOR A MICROPROCESOR AND SYSTEM

(75) Inventors: Cameron McNairy, Windsor, CO (US); David Heckman, Fort Collins, CO (US); Jenna Mayfield, Windsor, CO (US); Scott Hoyt, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 13/992,379

(22) PCT Filed: Dec. 21, 2011

(86) PCT No.: PCT/US2011/066658
§ 371 (c)(1),
(2), (4) Date: Jun. 7, 2013

(87) PCT Pub. No.: WO2013/095470
PCT Pub. Date: Jun. 27, 2013

(65) Prior Publication Data
US 2014/0019814 A1    Jan. 16, 2014

(51) Int. Cl.
G06F 11/07 (2006.01)
G06F 11/263 (2006.01)
G06F 11/22 (2006.01)

(52) U.S. Cl.
CPC ......... *G06F 11/0766* (2013.01); *G06F 11/079* (2013.01); *G06F 11/0781* (2013.01); *G06F 11/2215* (2013.01); *G06F 11/2268* (2013.01); *G06F 11/263* (2013.01)

(58) Field of Classification Search
CPC ........... G06F 11/0766; G06F 11/0781; G06F 11/079; G06F 11/2268; G06F 11/263
See application file for complete search history.

(56) References Cited

U.S. PATENT DOCUMENTS 5,408,218 A * 4/1995 Svedberg et al. ............. 340/507
5,568,491 A * 10/1996 Beal et al. ..................... 714/746
(Continued)

OTHER PUBLICATIONS

PCT International Search Report for PCT Counterpart Application No. PCT/US2011/066658, 3 pgs., (Sep. 26, 2012).
(Continued)

*Primary Examiner* — Albert Decady
*Assistant Examiner* — Paul Contino
(74) *Attorney, Agent, or Firm* — Nicholson De Vos Webster & Elliot LLP

(57) ABSTRACT

In accordance with embodiments disclosed herein, there are provided methods, systems, mechanisms, techniques, and apparatuses for implementing an error framework for a microprocessor and for a system having such a microprocessor. The error framework may alternatively be implemented by a hardware component, such as a peripheral device for integration into a system. In one embodiment, an error framework of a microprocessor or a hardware component includes an error detection unit to capture an error within the hardware component; a state detection unit to capture error context information when the error is detected within the hardware component; an error event definition unit to define a unique error event representing a combination of the error and the error context information; and a configuration unit to define an error event response based on the unique error event. The error context information may include, for example, a known state of a system at the time the error occurs or a known state of the hardware component or microprocessor within which the error is detected at the time the error occurs.

17 Claims, 14 Drawing Sheets

(56) References Cited

U.S. PATENT DOCUMENTS

| | | | |
|---|---|---|---|
| 7,231,550 B1* | 6/2007 | McGuire et al. | 714/26 |
| 7,346,812 B1* | 3/2008 | Wickeraad | 714/48 |
| 7,516,025 B1* | 4/2009 | Williams et al. | 702/57 |
| 7,949,904 B2 | 5/2011 | Ritz et al. | |
| 8,046,639 B1* | 10/2011 | Nordin et al. | 714/41 |
| 2006/0253740 A1* | 11/2006 | Ritz et al. | 714/38 |
| 2007/0220332 A1* | 9/2007 | Marisetty et al. | 714/30 |
| 2007/0260932 A1 | 11/2007 | Prichard et al. | |
| 2009/0009351 A1* | 1/2009 | Lamontagne | 340/646 |
| 2009/0125755 A1* | 5/2009 | Herscovitz et al. | 714/15 |
| 2009/0183025 A1* | 7/2009 | Palazzolo et al. | 714/5 |
| 2009/0259890 A1 | 10/2009 | Lund et al. | |
| 2009/0319621 A1* | 12/2009 | Barsness et al. | 709/206 |
| 2011/0150507 A1* | 6/2011 | Kim | 399/31 |
| 2011/0219274 A1* | 9/2011 | Cho et al. | 714/708 |
| 2011/0264964 A1* | 10/2011 | Murphy et al. | 714/48 |
| 2012/0144251 A1* | 6/2012 | Carey et al. | 714/57 |
| 2012/0151278 A1* | 6/2012 | Tsantilis | 714/48 |
| 2012/0215492 A1* | 8/2012 | Masurkar | 702/185 |
| 2016/0170822 A1* | 6/2016 | Ye et al. | G06F 11/079 714/38.1 |

OTHER PUBLICATIONS

PCT Written Opinion of the International Searching Authority for PCT Counterpart Application No. PCT/US2011/066658, 3 pgs., (Sep. 26, 2012).

PCT Notification concerning Transmittal of International Preliminary Report on Patentability (Chapter I of the Patent Cooperation Treaty) for PCT Counterpart Application No. PCT/US2011/066658, 5 pgs., (Jul. 3, 2014).

Taiwan Invention Patent Application No. 101143269, Patent Examination dated Feb. 4, 2015.

Taiwan Invention Patent Application No. 101143269, IPO Search Report dated Jan. 12, 2015.

* cited by examiner

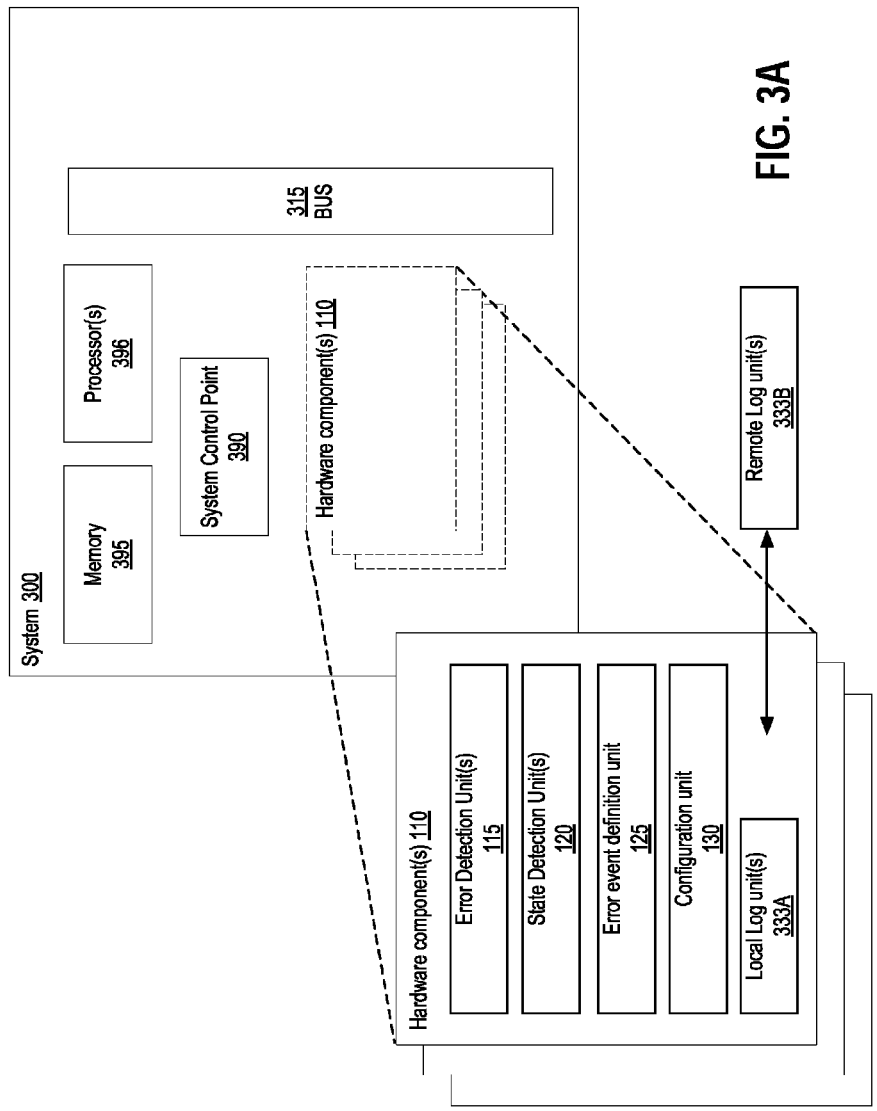

1000

ERROR FRAMEWORK FOR A MICROPROCESOR AND SYSTEM

CROSS-REFERENCE TO RELATED APPLICATION

This patent application is a U.S. National Phase Application under 35 U.S.C. §371 of International Application No. PCT/US2011/066658, filed Dec. 21, 2011, entitled ERROR FRAMEWORK FOR A MICROPROCESSOR AND SYSTEM.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing an error framework for a microprocessor and for a system having such a microprocessor.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In computing nomenclature, the term "RAS" stands for Reliability, Availability, and Serviceability. Some computing platforms are intentionally designed with a high level of RAS features which may constitute a balance of hardware and software capabilities to implement or solve the desired RAS features and functionality. Supporting and implementing RAS, however, can be complex and may present difficult design considerations.

For example, as RAS capabilities and features increase, the mechanisms for implementing them have not always been standardized. The lack of standardization leads a lack of agreement between computing components on given platform regarding what information, events, and errors should be detected, and also the manner and mechanisms for reporting such information, events, and errors, and further, what action or behavior, if any, to take upon the discovery of such information, events, and errors.

The lack of standardization additionally leads to confusion and difficulty for firmware designers who must interface their respective functionality to hardware components, which may each have different schemes for reporting and handling RAS related information, events, and errors. For example, where logging is unique to each given hardware component, a unique implementation must be derived to handle the specific implementation. Further still, discovering errors may lack comprehensive support and coverage because over many different implementation schemes, it may not be knowable precisely what to look for in terms of an indication that an error has occurred. Thus, conventional mechanisms have involved querying for errors which introduces additional overhead and computational waste. Distinct queries to each of several different computing components may be necessary as well, in an attempt to discover any potential errors among the different computing components.

There is a need to balance the implementation of RAS capability with efficient processing of workload. Although such RAS features may very well be desirable, they nevertheless represent computing overhead, and thus, displace computational resources which may otherwise be directed toward handling a primary workload computational task. This necessity for querying multiple different computing components distracts from the actual workload to be handled by a limited set of computational resources, and may further slow error recovery.

The present state of the art may therefore benefit from systems and methods for implementing an error framework for a microprocessor and for a system having such a microprocessor as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 3A illustrates an exemplary system into which a hardware component which implements an error framework may be integrated in accordance with one embodiment;

DETAILED DESCRIPTION

Figure 1:
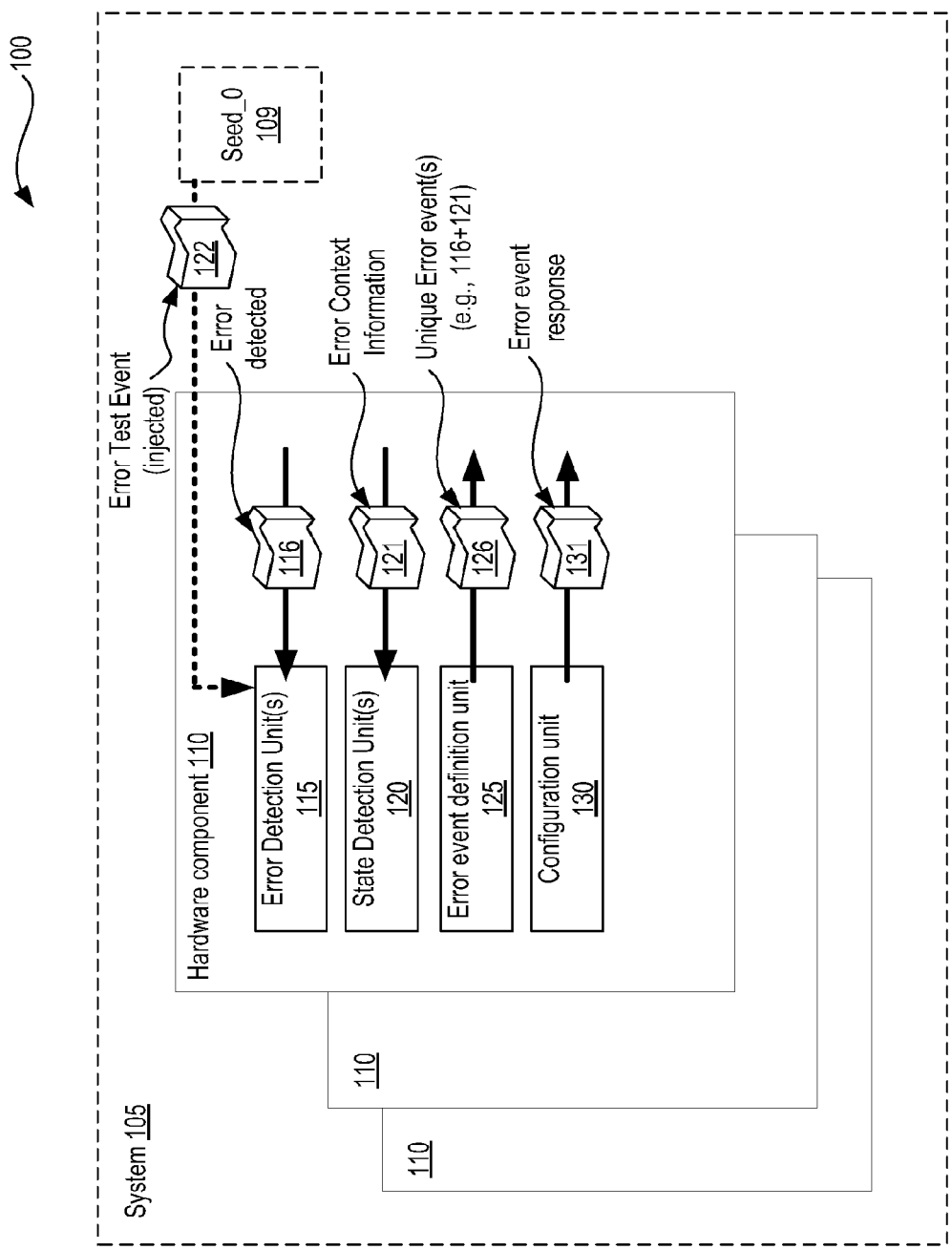
FIG. 1 illustrates an exemplary architecture in which embodiments may operate.

Described herein are systems and methods for implementing an error framework for a microprocessor and for a system having such a microprocessor. The error framework may alternatively be implemented by a hardware component, such as a peripheral device for integration into a system.

In one embodiment, an error framework of a microprocessor or a hardware component includes an error detection unit to capture an error within the hardware component; a state detection unit to capture error context information when the error is detected within the hardware component; an error event definition unit to define a unique error event representing a combination of the error and the error context information; and a configuration unit to define an error event response based on the unique error event. The error context information may include, for example, a known state of the system within a range of cycles during which the error occurs or a known state of the hardware component within which the error is detected during the range of cycles in which the error occurs.

For example, in one embodiment an error event is formulated and presented to the configuration unit to determine "how" to deal with the event. The event details and the configuration unit "how" is sent to the log unit which uses the information to determine what to log for the new event and what information from the previous logged error (if anything). The log unit then distills this information and may optionally forwards it on to an aggregation hierarchy. The aggregation hierarchy, if used, further distills available information to form an indication to the control point and may filter and distill using one or more levels of aggregation.

Practice of the disclosed embodiments provides an efficient and capable framework to create error events. Benefits of such a framework may include, for example, capability to define hardware and software responses for error events, log the error event in a robust and reliable manner, report the error event efficiently with indications of "first," and respond to the error event to enable high reliability, availability and serviceability, known as "RAS." With regard to RAS:

"Reliability" ensures fidelity of computational work such that intended results are achieved despite unexpected state changes or component failures.

"Availability" is the amount of time a device is actually operating as the percentage of total time it should be operating. In high availability applications, availability may be reported as minutes or hours of downtime per year. Availability features allow the system to stay operational even when faults do occur, for example, by quickly addressing any situation that may detract from the intended task, including: identifying, correcting, and reporting a reliability related event.

"Serviceability" represents the ability of the component to correctly and efficiently report any loss of reliability or availability for evaluation of what may be wrong with the system and what should be done to ensure further reliability and availability.

In accordance with the disclosed embodiments, systems, methods, and mechanisms include the generation and definition of error events based on available detection, circumstances, and state of the error. For example, a parity error is associated with additional detail such that it is not simply a parity error, but rather, it may be a parity error with replay, or parity error on a non-modified data line such that it can be invalidated, and so forth. Association of such error events may be defined with a signal and a corresponding severity as provided by configuration units for any given error event and may further be defined with an appropriate hardware response for each such error.

Log units may be used to reflect the highest signal and severity combination seen by the log unit since the last clear. Log units may be configured to present all necessary information about the error event such that knowledge of which log unit is accessed is not required. A log unit may change a received and/or logged severity into a "signal" or the log unit may pass the full "signal" received on to a next level, such as an aggregator, control point, etc. A log unit may take a portion of a received and/or logged severity and generate the signal directly from the subset of the severity. An indication of a lost signal and severity may be provided rather than a simple overflow indication, thus providing improved determination of need to promote severity to maintain integrity. Ability to log multiple error events may be provided when such errors occur simultaneously or sequentially without an intervening log clearing.

Ability to write to a log unit (e.g., error injection) effectively emulates the software response of any error event. A log unit interlock mechanism may be provided to ensure that new errors received after a clearing operation begins and before the clearing operation completes does not cause a loss of information for the new error information. An aggregation paradigm may be provided to enable log units to be algorithmically identified. For example, an aggregation paradigm may be provided that enables indication, either directly or indirectly, of event order sequence (i.e. first, second, third, etc.) among the log units thus aiding diagnosis by establishing sequence and causality among logged errors A software paradigm may be provided for abstracting the available error information into a format well suited for automated processing despite differences in log format. A software paradigm may be provided for abstracting the error information into format required by a system's architectural expectations.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a system to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. In accordance with one embodiment, an error framework is implemented within one or more components 110, such as within the subsystem of a microprocessor or other compute device such that a single microprocessor or other compute device may have a multitude of instances. In such an embodiment, each of the one or more hardware components 110 include an error detection unit 115 to capture an error 116 within the hardware component 110; a state detection unit 120 to capture error context information 121 when the error 116 is detected within the hardware component 110; an error event definition unit 125 to define a unique error event 126 representing a combination of the error 116 and the error context information 121; and a configuration unit 130 to define an error event response 131 based on the unique error event 126.

In one embodiment, the error context information 121 includes a known state of the system 105 within a range of cycles during which the error 116 occurs or a known state of the hardware component 110 within which the error is detected during the range of cycles in which the error occurs. In one embodiment, the known state of the system or the known state of the hardware component 110 includes at least one of: the error 116 occurring during an allocation operation; the error 116 occurring during a read operation; the error 116 occurring during a write operation; the error 116 occurring before a retry; the error 116 occurring after one or more retries; the error 116 occurring during a read operation to an uncorrectable data error for which no alternative copies exist; the error 116 occurring during a read operation to an uncorrectable data error for which at least one alternative copy exists; the error 116 occurring during a read operation to a parity correctable data error; the error 116 occurring during an allocation operation before a flush attempt; the error 116 occurring during an allocation operation after one or more flush attempts; the error 116 occurring during an allocation operation for which an alternative allocation address exists; the error 116 occurring during an allocation operation for which no alternative allocation address exists; an instruction privilege at the time of the error; an access type at the time of the error; activity of older and/or younger instructions/requests at the time of the error; the error occurring coincident, before or after another similar accesses of either a read or a write access type; the error occurring coincident, before or after activity in another functional unit that is affected by or affects the operation experiencing the error; the error occurring before, during, or after a translation operation; the error occurring before, during, or after an allocation, a read, a write, a replay, a retry, a flush, a speculative operation, a privileged operation, a mode change operation, a run versus wait operation; the error occurring in association with architectural semantics of the system; the error occurring based on environment factors including Voltage, Frequency, Temperature, or a combination thereof; the error occurring in association with manufacturing process technology for the system; the error occurring based on an availability of redundant resources or functional units within communicably interfaced with or within the system; and the error occurring based on a state of another functional unit not including the hardware component.

A typical error 116 may be, for example, a parity or error code which is caught or detected and the error detection unit 115 determines that something is not correct or determines that a fault has occurred. The error states must match the detected known state of the system as described above. For example, an uncorrectable parity error on a line that is non-modified is thus available to be invalidated without consequences to correct operation. With conventional systems, a caught or detected error 116 is provided in total isolation without any additional error context information 121 pertaining to the error. The state detection unit 120 captures and provides the additional error context information 121 to the error event definition unit 125 which combines the error 116 detected with the additional error context information 121 to define and provide the unique error event 126. Hardware components 110 provide various error detection mechanisms such as parity, error-correcting code (ECC), multi-hot, poison, residual and so forth. Unique error events 126 are defined based on the detection mechanism (e.g., a parity error) and based further on other available error context information 121 such as pipeline stage, frequency, temperature, activity in other resources and the state of the affected operation. For example, ECC protection alone may generate multiple distinct and unique error events 126 based on the state of the cache line (e.g., an uncorrectable ECC error on a line that is in E or S, etc.).

The unique error event 126 is provided to the configuration unit 130. In such an embodiment, the unique error event 126 is defined as the detected error 116 plus the additional error context information 121. The configuration unit 130 defines what hardware response or software response, or both, are to be initiated for each unique error event 126 defined.

The configuration unit 130 provides flexibility by being configurable, such that any unique combination of a detected error 116 plus additional error context information 121 can be mapped to an appropriate response based on the design needs for the particular hardware component 110.

The configuration unit determines both the hardware response 225 and how log units are updated for an event associated with the given structure. This configuration is unique for each event, but has the same basic structure for each event. A group of events may be combined in a single configuration unit 130 if desired. The error configuration unit 130 provides a hardware response and a log severity and signal, each of which may take effect at a threshold(s) as warranted (optional) for every error event that the block can generate. Based on the threshold, the HW response as well as the SW/log response may be invoked.

An optional seed unit "Seed_0" 109 is further depicted as communicating an error test event 122 into the error detection unit 115. Having full write capability for the log units (depicted at FIG. 2) enables emulation of the event. In one embodiment, seed unit 109 injects an error test event 122 into error detection logic 115 or onto a path communicably interfaced with or monitored by the error detection logic 115, such as bit protection generation logic. In an alternative embodiment, a severity and a signal requiring a panic event are written into the log units and the log will responsively drive the panic out.

In one embodiment, at least one of the one or more hardware components 110 includes a seed unit 109. In such an embodiment, the seed unit performs error test event 122 injection by writing an error test event 122 into the hardware component 110 having the seed unit 109 to trigger error detection by the error framework for the hardware component 110. In one embodiment, the error detection unit 115 captures an error 116 responsive to the error test event 122; the state detection unit 120 captures error context information 121 for the system or the hardware component 110 responsive to detecting the error 116 associated with the error test event 122; the error event definition unit 125 defines a unique error event 126 representing a combination of the error 116 corresponding to the error test event 122 and the captured error context information 121; and a configuration unit 130 defines an error event response 131 based on the unique error event 126 defined responsive to the error test event 122. Seeding therefore provides a testing feature to inject a known input and determine whether the result or behavior of the error framework is correct.

Figure 2:
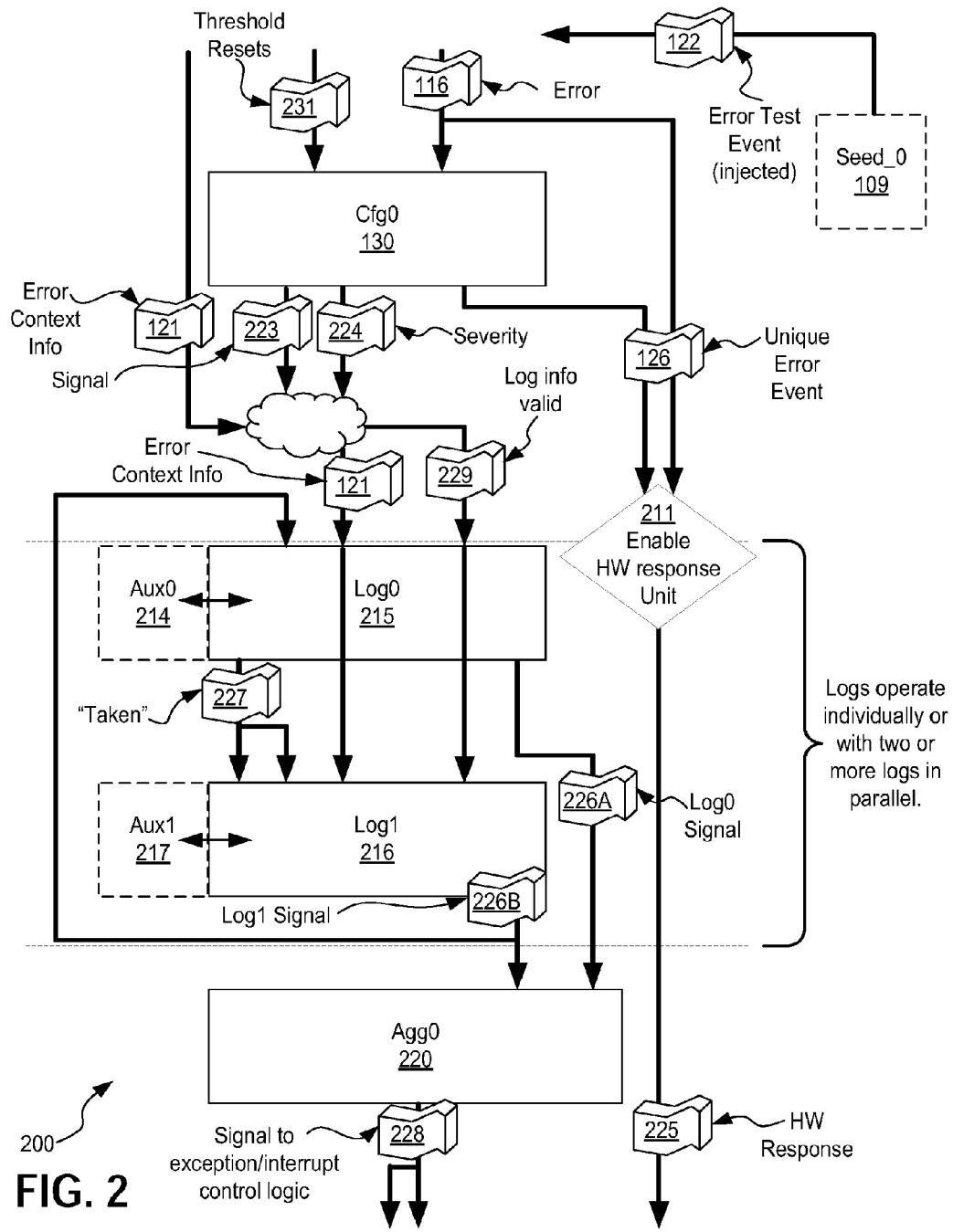
FIG. 2 illustrates an exemplary error framework in additional detail.

FIG. 2 illustrates an exemplary error framework 200 in additional detail. For example, configuration unit "Cfg0" 130 is depicted, log unit "Log 0" 215 is depicted, log unit "Log 1" 216 is depicted, and aggregation unit "Agg0" 220 is depicted. Also shown is an optional auxiliary unit "Aux0" 214 associated with log unit 215 and an optional auxiliary unit "Aux1" 217 associated with log unit 216.

In one embodiment, the error event definition unit 125 defines a plurality of unique error events 126, each of the plurality of unique error events 126 corresponding to a unique combination of the detected error 116 and the associated error context information 121 for the detected error 116.

In one embodiment, the configuration unit 130 maps the unique error event 126 to a corresponding response for handling the unique error event 126. For example, the corresponding response may be a hardware response 225, a software response to be implemented via a control point of the system, or both.

Logic creates the hardware response 225 and/or software response with an assigned signal 223 and severity 224 when an error 116 occurs and is detected. In one embodiment, the configuration unit 130 maps the error 116 associated with a first severity and signal to a first hardware response 225 and/or software response based on the combination of the error 116 and the error context information 121 represented by the unique error event 126; and maps the same error 116 associated with a second severity and signal, different than the first severity 224, to a second hardware response 225 and/or software response, different than the first response, based on the combination of the error 116 and the error context information 121 represented by the unique error event 126.

In one embodiment, the configuration unit utilizes two formats. An 8-bit structure having 2-bits to encode severity, 2-bits to encode signal, 1-bit to encode the hardware response 225, and 3 bits for use as a threshold counter. For example, the threshold counter may be referenced by a rule which implements a particular hardware response 225 every time an error 116 occurs, but for which a software response is only engaged based on the threshold counter exceeding a specified limit or threshold. Thus, the first several errors will get hardware corrected with no software signal passed, and then once a threshold is exceeded, the software signal is passed to initiate a software response from higher systems, such as the operating system or firmware.

In one embodiment, the configuration unit 130 makes a decision regarding what the threshold is and what action to take based on the threshold counter surpassing the defined limit or threshold. For example, that decision may be to initiate the software response and pass an appropriate software signal. A threshold reset 231 is depicted as being passed into the configuration unit 130 to reset threshold counters or initialize threshold counters when necessary. In one embodiment, the threshold reset is unique to the event 126 and thus, each error event has its own unique reset criteria.

A software stack may determine a final error indication path and message based on all known events, including passed signal 223 and severity 224. The error's severity 224 gives additional detail to the error's signal 223, and thus, the meaning of any severity 224 value may change with a change in the signal 223. The signal 223 and severity 224 in combination are significant to software and are intended to inform software of what it is expected to do (if anything) for any given unique error event 126 and is utilized by the hardware component to establish log updates and lost indications.

In one embodiment, the corresponding response for handling the error event includes at least one of: enabling a hardware response 225 for the error 116 with no corresponding software response; enabling a hardware response 225 for the error 116 with a complementary software response; enabling a software response for the error 116 and a notification to the system to implement the software response for the error 116, with or without a complimentary hardware response 225; notifying the system of an unrecoverable error within the hardware component 110 within which the error 116 is detected; and enabling a response handling operation selected from the group comprising: a retry; an abort; a correction; a propagation; an ignore; a continue; a reconfiguration instruction; an instruction to a functional unit; canonization; a change to resources of the system; and a change to an execution path. In one embodiment, enabling the hardware response or the software response or both for the error includes at least one of: an instruction to correct, contain, abort, retry, ignore, panic, or disable responsive to the error.

For example, based on the state of the machine (e.g., state y), the configuration unit 130 may determine that, when error "x" occurs and state "y" is operationally present, then resulting action may be to signal a catastrophic event in order to take down or panic the machine. For example, if state "y" defines an uncorrectable state, it may be preferable to take down the machine rather than risk having corrupted data exposed to the various components of the system. Conversely, when state "z" occurs, the configuration unit 130 may define that an error 116 is correctable, and thus, the configuration unit 130 implements or triggers a software response to correct for the error 116 via software.

Such errors may relate to, for example, a data cache encountering an uncorrectable error. However, if such an error affects data that is not modified (e.g., error context information 121 identifies a non-modified cache line state), then the error can be corrected by hardware and/or software based on combined signal and severity. Conversely, if the cache line has been modified, then the error is not correctable in system software. Thus, the configuration unit 130 must define a unique error event 126 which bubbles up to the system for decision making or define a unique error event 126 which triggers a machine takedown based on the signal and severity. In accordance with one embodiment, state represents the condition of the machine. Thus, depending on the error 116 and the state as represented by the error context information 121, an assigned signal 223 and severity 224 may be worse or better for an identical error 116.

Using the hardware response 225 and the state information, the configuration unit 130 may identify whether an operation is concerned with reads vs. writes. The configuration unit 130 may define and trigger responses such as flush and retry, stop then proceed, or take more severe action for containment, such as signaling a catastrophic event. Such variability is made possible by splitting up the detected errors into different states so as to yield many distinct unique error events 126 for a single type of error 116.

In one embodiment, the configuration unit 130 communicates the defined unique error event 126 to an enable hardware response unit 211. In such an embodiment, the enable hardware response unit 211 performs one of the following actions: (a) the enable hardware response unit 211 declines to enable a hardware response 225 (e.g., configuration unit 130 does not assert to "enable" until after a threshold is reached based on a threshold counter); (b) the enable hardware response unit 211 enables a hardware response 225 to the error 116 based on the unique error event 126 and passes the hardware response 225 to the hardware component 110 for consumption by the hardware component; or (c) the enable hardware response unit enables the hardware response to the error based on the unique error event and passes the hardware response to another hardware component not including the hardware component within which the error is detected. For example, the hardware component 110 detecting the error may not consume the error, but instead, enable a hardware response within a separate and distinct component. Take for example an integer register file in which an error is detected. The error occurs at the integer register file buy is detected by the hardware component 110, thus, the hardware solution is not to be consumed by the hardware component 110 detecting the error, but rather, is communicated to the integer register file's hosting hardware component for resolution via the enabled hardware solution. Such a solution may be to discard the results and retry, or other options as are described herein.

Thus, the entirety of the hardware response 225 may take place within the hardware component itself. Thus, the hardware response 225 may be enabled by the hardware component and consumed responsive to the error 116 by the hardware component or alternatively, a hardware response 225 may cross hardware components and thus, be consumed elsewhere, for example, by another processor, by another memory, by another peripheral device, and so forth.

In one embodiment, the configuration unit 130 outputs information that determines whether or not the enable hardware response unit 211 responds with, passes, or triggers a hardware response 225 or responds with, passes, or triggers a software response which is sent to a logging unit. In one embodiment, the enable hardware response unit 211 alters the state of the system or alters the behavior of the system to correct the error 116 or to contain the error 116. For example, by triggering a flush event, a retry event, and so forth. In one embodiment the enable hardware response unit alters the state of the system or alters the behavior of the system responsive to the error by altering the environment of the system through a change to at least one of frequency, voltage, temperature, or a combination thereof.

In one embodiment, the configuration unit causes the enablement of a software response to the error or causes the enablement of a hardware response to the error, or causes the enablement of both the hardware response and the software response to the error, based on a threshold counter.

In one embodiment, the configuration unit 130 assigns a signal 223 and severity 224 to the defined unique error event 126 based on the combination of the error 116 and the error context information 121 represented by the unique error event 126. Thus, each unique error event 126 maps to a signal 223 and severity 224. The signal 223 and severity 224 is sent to a log unit, such as 215 and/or 216, and the log units store the unique error event 126 with the highest signal 223 and severity 224 combination. In one embodiment error information in the log unit is captured such that the contents of the log unit represents all available error information (including indicating and storing of additional information in the Auxiliary unit) associated with the highest signal/severity combination seen by that log unit. There may also be some implied severity with a given signal category because each signals' 223 corresponding severity 224 is potentially unique. Firmware may evaluate signal 223 and severity 224 combinations for all logged unique error events 126 and synthesize an architected error indication mechanisms, Each of the hardware components may include one or more log units 215 and 216 and in such an embodiment, the configuration unit 130 communicates the severity 224 and a signal 223 embodying the unique error event 126 to the log unit 215 and/or 216 and the log unit stores the severity 224 sufficient to uniquely identify the unique error event and the severity of the unique error event. In the configuration unit 130 the signal and severity is combined with error specific information such that when the highest signal and severity combination is presented, the accompanying or associated information will be appropriately logged.

In one embodiment, each of the one or more hardware components 110 includes two or more log units 215 and 216 in parallel communication with the configuration unit 130. As is noted by the figure, the logs may operate individually in the absence of a second log, or the logs may operate in parallel with two logs or more than two logs. In one embodiment, the configuration unit 130 generates two or more unique error events 126 in parallel within a single cycle and communicates, in parallel within the single cycle, a severity for each of the two or more unique error events 126, and a signal for each of the two or more unique error events 126 to the two or more log units.

In one embodiment, a first of the two log units stores the severity and the signal for the highest of the severity and signal combinations from among the two or more unique error events 126 communicated by the configuration unit 130 and a second of the two log units stores the severity and the signal for the second highest of the severity and signal combinations from among the two or more unique error events 126 communicated by the configuration unit 130. Alternatively, the log may store only the severity among the two or more unique error events 126 communicated by the configuration unit 130 and a second of the two log units stores the severity the second highest of the severities from among the two or more unique error events 126 communicated by the configuration unit 130 (e.g., not the signals). For example, where the configuration unit 130 generates too many severities or signal/severity combinations in given period of time, then use of the two log units 215 and 216 enablers tracking of the two highest severities or severity/signal combinations rather than simply recording the second highest severity or severity/signal combination as lost.

Where two or more log units 215 and 216 are utilized for a given hardware component, each log unit 215 and 216 may pass its own log signal to an aggregation unit 220. For example, Log 0 signal 226A is depicted as being passed from Log 0 215 to Agg0 220 and Log 1 signal 226B is depicted as being passed from Log 1 216 to Agg0 220.

Further still, communication between the two or more log units 215 and 216 is permissible. For instance, Log 0 215 is depicted as sending a "taken" 227 message to Log 1 216 indicating that has "taken" and stored information for a unique error event. Also shown is that Log 1 216 may communicate Log 1 signal 226B back to Log 0 215. Further still, error context information 121 arriving at Log 0 215 is passed in parallel also to Log 1 216, as is a log info valid signal 229 which is depicted as being passed to both Log 0 215 and Log 1 215.

Also depicted is a signal to exception/interrupt control logic 228 being passed from the aggregation unit 220 to, for example, a control point within the software, firmware, or operating system communicably interfaced with the error framework of the hardware component 110.

FIG. 3A illustrates an exemplary system 300 into which one or more hardware component(s) 110, each of which implements an error framework may be integrated, installed, or configured, in accordance with one embodiment. System 300 includes a memory 395 and a processor or processors 396. System 300 includes communication bus(es) 315 to transfer data within system 300 and a system control point 390 to receive signals communicated from the hardware components 110 when interfaced within the system 300.

Depicted separately are the one or more hardware component(s) 110 which may be manufactured and sold separate from the system 300 but later configured and integrated with such a system 300. In one embodiment, hardware components 110 are to be integrated into a computing system such as system 300. In one embodiment, each of the one or more hardware components 110 implement an error framework including: an error detection unit 115 to capture an error within the hardware component 110; a state detection unit 120 to capture error context information 121 when the error is detected within the hardware component 110; an error event definition unit 125 to define a unique error event 126 representing a combination of the error and the error context information 121; and a configuration unit 130 to define an error event response 131 based on the unique error event 126. The one or more hardware components 110 may further implement one or both of local log unit(s) 333A and/or remote log unit(s) 333B, as depicted. For example, remote log unit(s) 333B may be configured within the system 300 and external to the hardware component 110 which communicates with the remote log unit 333B.

In accordance with one embodiment, a system 300 having one or more hardware components which implement the error framework further includes a control point 390. In such an embodiment, the control point 390 performs at least one of the following actions: initiate actions responsive to signals received from an aggregation unit associated with the error framework; communicate an event error response or a software response, or both, to a communicably interfaced operating system; communicate an event error response or a software response, or both, to communicably interfaced firmware; extract information from one or more log units for buffering (e.g., to facilitate adaption of error log information from a native hardware format to a required software and/or firmware format); clearing information from one or more log units (local 333A and/or remote 333B); performing a standardized log retrieval operation without regard to a type or identity of a hardware component 110 having generated information for one or more log units; buffering information from one or more log units and altering the buffered information to match an expected format of an entity to consume the buffered information; and tracing a reverse path from an aggregation unit to a log unit to retrieve information stored in the log unit and additional information stored in an auxiliary unit when available.

Figure 3B:
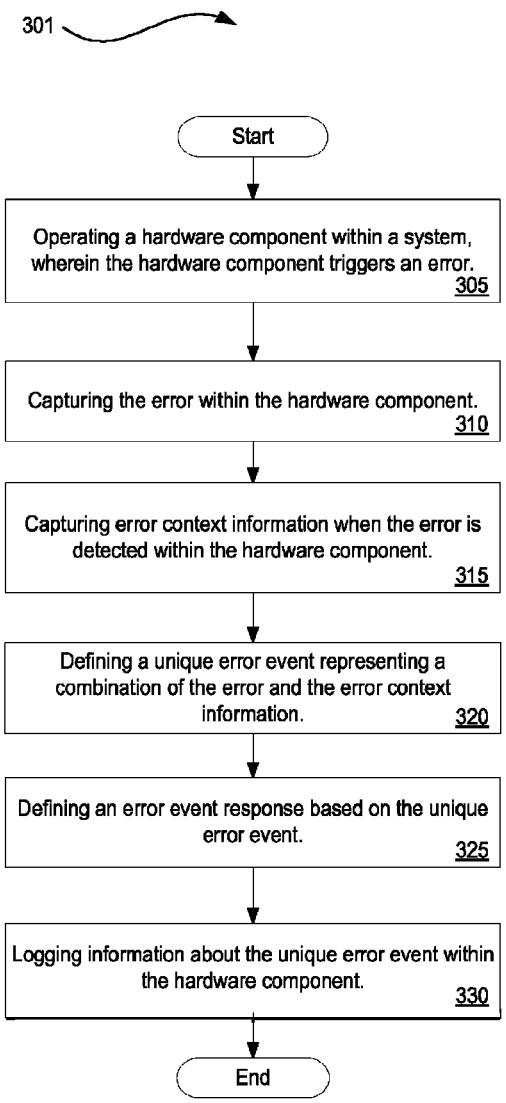
FIG. 3B is a flow diagram illustrating a method for implementing an error framework for a microprocessor and for a system having such a microprocessor in accordance with described embodiments.

FIG. 3B is a flow diagram 301 illustrating a method for implementing an error framework for a microprocessor and for a system having such a microprocessor in accordance with described embodiments. Method 301 may be performed by processing logic that may include hardware (e.g., circuitry, dedicated logic, programmable logic, microcode, etc.), software (e.g., instructions run on a processing device to perform the methodologies and operations described herein). Some of the blocks and/or operations of method 301 are optional in accordance with certain embodiments. The numbering of the blocks presented is for the sake of clarity and is not intended to prescribe an order of operations in which the various blocks must occur.

Method 301 begins with processing logic for operating a hardware component within a system, wherein the hardware component triggers an error (block 305).

At block 310, processing logic captures the error within the hardware component.

At block 315, processing logic captures error context information when the error is detected within the hardware component.

At block 320, processing logic defines a unique error event representing a combination of the error and the error context information.

At block 325, processing logic defines an error event response based on the unique error event.

At block 330, processing logic logs information about the unique error event within the hardware component.

In accordance with one embodiment, a non-transitory computer readable storage medium stores instructions that, when executed by a processor in a computing system, the instructions cause the computing system to perform one or more of the operations set forth in the flow diagram 301. For example, instructions may cause the processor of the system to perform operations including: operating a hardware component within a system, wherein the hardware component triggers an error; capturing the error within the hardware component; capturing error context information when the error is detected within the hardware component; defining a unique error event representing a combination of the error and the error context information; defining an error event response based on the unique error event; and logging information about the unique error event within the hardware component.

Figure 4A:
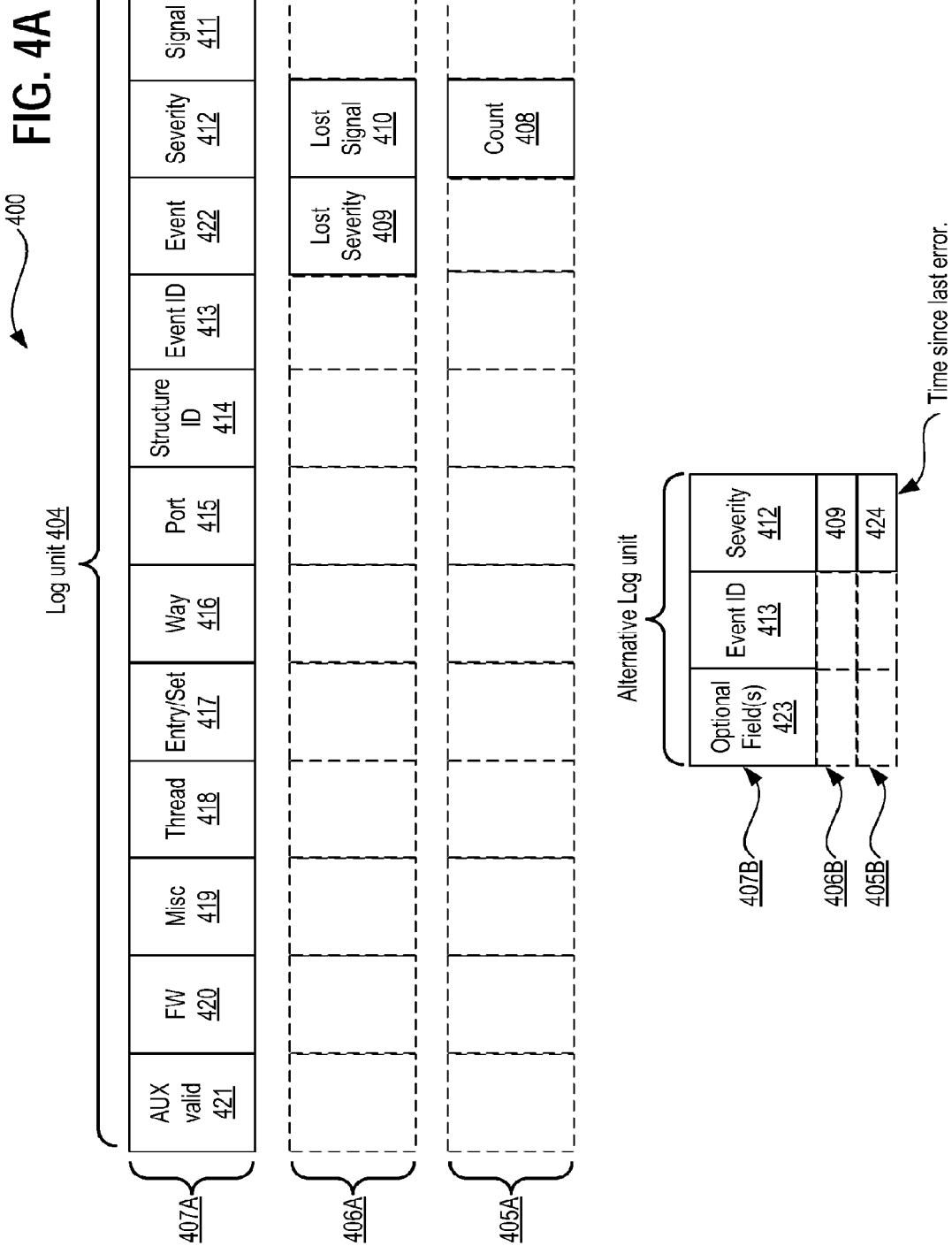
FIG. 4A illustrates an exemplary architecture for a log unit in accordance with one embodiment.

FIG. 4A illustrates an exemplary architecture 400 for a log unit in accordance with one embodiment.

In one embodiment, the log unit 404 stores three tiers of error data, the three tiers including: a first tier 405A of error data representing a count 408 of errors logged since the log unit 404 was cleared; a second tier 406A of error data representing a lost severity 409 and a lost signal 410 corresponding to an error event superseded by another error event in the log unit 404; and a third tier 407B of error data corresponding to a highest severity unique error event 126 received by the log unit 404, the third tier 407B of error data including at least a signal 411 for the unique error event 126, a severity 412 for the unique error event 126, an event identifier 413 for the unique error event 126 and one or more optional fields 423 associated with the highest severity unique error event 126 received by the log unit 404. In an alternative embodiment, the most specific tier corresponds to 407A which again includes including at least signal 411, severity 412, and an event identifier 413, and further in which the one or more optional fields are selected from the following depicted fields: a structure identifier 414, a port 415, a way 416, an entry and/or set 417, a thread 418, a miscellaneous field 419, a firmware field 420, and an auxiliary valid field 421 indicating whether non-standardized miscellaneous data is available for the highest severity unique error event 126 received by the log unit 404.

In one embodiment, a log unit is broken into the following general areas: identifier, what, where, who, and miscellaneous. Only the miscellaneous fields may permissibly be log unit specific. The remaining fields must adhere to the prescribed behavior to support standardization.

In one embodiment, the event count 408 (4 bits) represents a value corresponding to each update to the log unit. A non-zero value indicates that a valid error event has been logged. This count 408 should increment with any error update to the log unit 404.

A write of an event count equal to, for example, 1111 or equal to the current event count value will reset the count to zero. A write of count 408 greater than the current event count value will write that value into count 408. This counter 408 saturates at 0xf. The count 408 value is available to the Auxiliary unit (e.g., depicted as Agg0 220 at FIG. 2) to provide a means of consistency assurance between Auxiliary units and Log units. Alternatively, a control register or control field may be utilized to indicate a number of updates and provide an interlock mechanism.

In one embodiment, the log unit implements a clearing interlock mechanism via a count field 408. In one embodiment, the count field 408 stores a count of errors logged since the log unit 404 was cleared. In such an embodiment, the count field 408 is incremented every time a new signal and severity is received, regardless of whether or not the new signal and severity is sufficiently high to be stored by the log unit 404 as a highest severity unique error event 126 or as a next highest severity unique error event 126 for which a lost signal 410 and lost severity 409 is stored by the log unit 404.

In one embodiment, the count field 408 is read before initiating a clear of the log unit 404 and the count field 408 is cleared when a current count field value corresponds to the previously read count field value. In such an embodiment, the log unit 404 is not cleared when the current count field value is different than the previously read count field value.

In an alternative embodiment, log unit implements a clearing interlock mechanism via a time field 424 which changes with each error event, in which the time field stores a time since the log unit was cleared or a time that the log unit was cleared or a time since the last error event or a time of the last error event. In such an embodiment, the time field is read before initiating a clear of the log unit and the log unit is not cleared when a current value of the time field is different than expected.

Because the hardware or software agent managing the log unit may read information and then clear out the log unit later, there is a potential for more important information to be lost if a clear operation wipes the detail before a last and a new read. However, by using the interlock mechanism based on the count 408, if the hardware or software agent reads an event count of two, and then initiates an instruction to clear the log unit 404 only when the count 408 has a value of two, then a subsequent increment of the count 408 to a value of three will trigger a wipe failure and the hardware or software agent can then go back and re-check for a more important error in the log unit 404 or trigger a new clear operation.

In one embodiment, the signal (2 bits) 411 represents what is signaled to the processor core when a unique error event occurs. If a new signal 411, from a log unit 404 write or from a unique error event is different from the currently logged signal value and the event count is non-zero, then a new signal 411 is driven to the exception/interrupt control logic or aggregation hierarchy with the new signal 411 value. In accordance with one embodiment, a single unique error event can have only one signal or one encoded signal embodying the unique error event.

Moreover, a single log unit generates only one signal, however, aggregation units can receive multiple of these signals. Thus, in one embodiment, the output of each log unit 404 is a three wire one hot bus to the aggregation unit.

In one embodiment, the current severity (2 bits) 412 represents an indication of the work the hardware component has already done or is doing, or the work that software should do, if anything. The hardware component utilizes this field in determining if a new event supersedes a previously stored tier three 407A or 407B and most detailed entry and thus updates the log unit 404 or the lost portion (409 and 410) of the log unit or updates nothing except a count 408.

In one embodiment, the lost Signal (2 bits) 410 and the lost severity (2 bits) 409 represents the same data as current signal 411 and severity 412, but is updated to indicate overflow when the tier three 407A or 407B most and detailed data is superseded by a new higher severity/signal combination unique error event. The overflow equation is based on signal and severity for the event and is consistent among every log unit 404.

In accordance with one embodiment, the log unit 404 is split into fields including a count 408 at tier 405A, lost severity and signal 409 and 410 regarding what happened previous to an overflow at tier 406A and detailed information about the error at tier three 407A or 407B. Structure is uniform across an entire chip or hardware component having the error framework implemented thereon. The log unit 404 has unit ID (structure ID 414) to identify source for any given error. The log unit additionally has an error event ID 413 to identify a unique error event logged which may be unique to a given structure ID. The log unit has a severity field 412, and signal 411, and rules define whether to log all information or update only lost fields at tier 406A or only a count 408 at tier 405A. For example, to update the structure ID 414 and the event ID 413, such a rule may require that a new signal event 422 having a severity 412 and signal 411 be greater than a present or older event 422 and severity 412 in the most detailed tier three 407A or 407B. Stated differently, whatever data is most important gets stored and updates all the available fields. If an incoming signal is not the most important, the next most critical signal updates and gets stored into the lost signal 410 and lost severity 409. The hardware or software agent may undertake special actions based on lost signal 410 and lost severity 409.

A minimalistic alternative log unit is also depicted having a most detailed tier 407B with optional fields 423, Event ID 413, and severity 412 (e.g., no signal). Another tier 406B provides lost severity 409 (e.g., no lost signal), and another tier 405B or another field provides a time since last error 424 rather than a count 408. However, the various tiers and fields may be combined in other ways.

The processor hardware provides end-to-end error protection in some cases, meaning as errant data travels through numerous structures, an error indicator travels with it to track and report error information at every possible point in the system. At most points the data is merely "passing by" and thus errors are not severe. However, at the endpoint the severity must be increased and the error must be handled appropriately to provide containment of incorrect data. This error framework pushes the signaling of the more severe (e.g., data consumption) events to the consuming unit to delay signaling of severe errors until the last possible moment, thus increasing system uptime, thus improving availability.

The error framework assigns Structure IDs 414 and Event IDs 422 to unique error events, enabling hardware or software agents to easily categorize errors, perform structure-specific corrective actions/responses, and streamline reporting to upper layers of firmware and software via the architected interface. The Structure ID 414 and Event ID 422 are integrated into the configuration and log unit 404 design, but are not propagated to the aggregation units. Specifically, it only the signal that is propagated resulting in a filtering hierarchy. However, where data is filtered out, more information is retrievable by querying deeper, allowing the most essential information to be easily available and processable and allowing the more detailed information to be systematically obtainable.

Figure 4B:
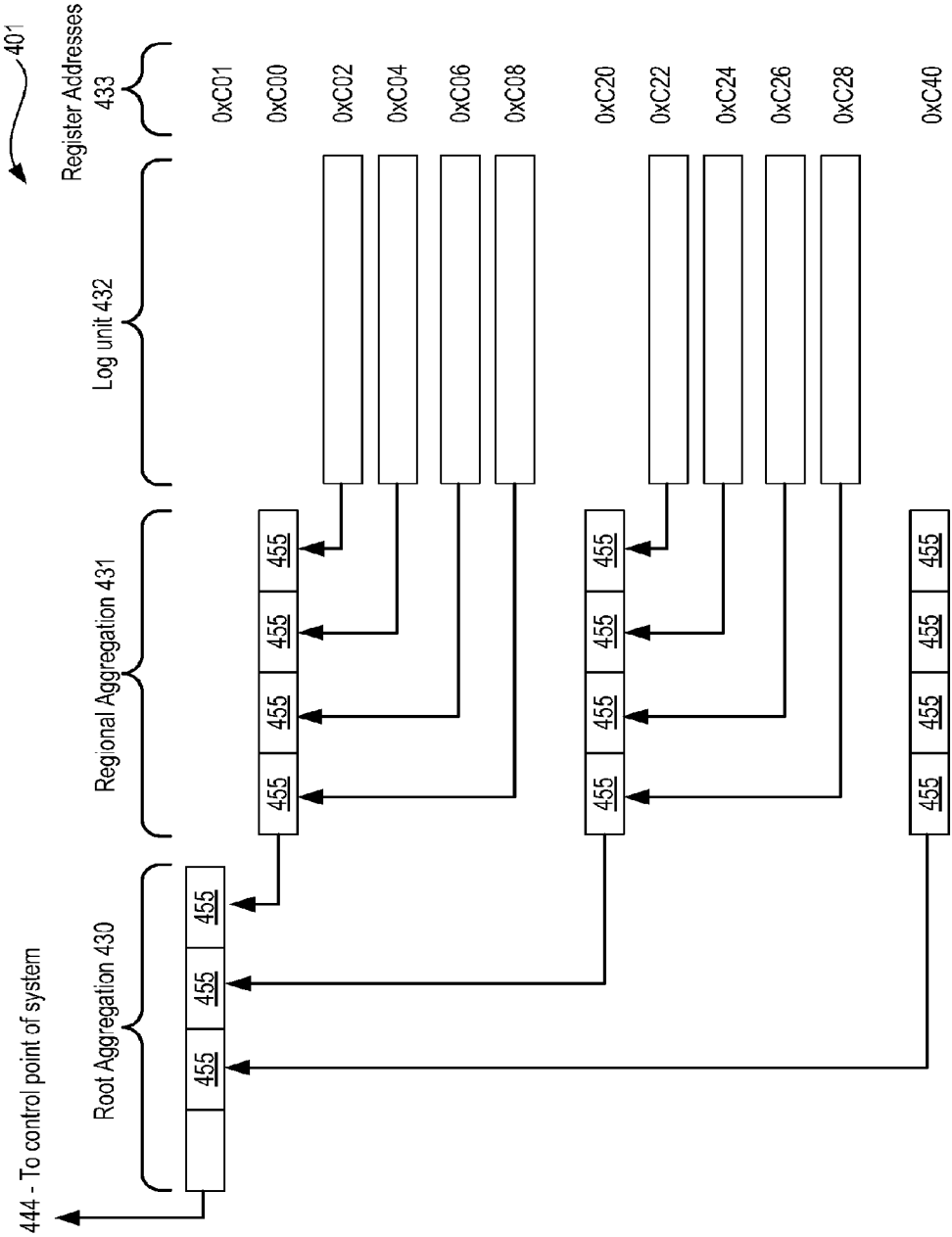
FIG. 4B illustrates an exemplary architecture of an aggregation scheme in accordance with one embodiment.

FIG. 4B illustrates an exemplary architecture 401 of an aggregation scheme in accordance with one embodiment. In particular, regional aggregation 431 and root aggregation 430 of log unit 432 data is depicted.

In one embodiment, each of the one or more hardware components having one or more log units further includes an aggregation unit. In such an embodiment, the configuration unit 130 assigns a signal and a severity to each of one or more defined unique error events 126 and communicates only the assigned severity representing each of the one or more defined unique error events 126 to the one or more log units 432. In one embodiment, each of the one or more log units communicates only the highest assigned severity to the aggregation unit.

The log units 432 in turn communicate a highest assigned severity to an aggregation unit. The aggregation unit (e.g., regional aggregation 431) stores a highest assigned severity from each of the one or more log units, and may in turn, pass the highest assigned severity to a root aggregation unit 430. Thus, a root aggregation unit 430 may have visibility to the highest severity among multiple log units within a hardware component or among a variety of hardware components for which root aggregation is performed. Moreover, the aggregation units themselves are optional and may operate with or without intervening log units. For example, aggregation units may capture severity from a configuration unit in the absence of an intervening log unit.

In one embodiment, the aggregation unit (regional aggregation 431 or root aggregation 430) passes the signals received to a control point 444 of the system for handling the detected error. In one embodiment, the aggregation unit 430 or 431 provides context of which of the one or more log units is storing a detected error and a reverse path to a corresponding log unit for each detected error within the aggregation unit 430 or 431. In one embodiment, the reverse path provides access to additional error information stored within the corresponding log unit for each detected error. Aggregation units and log units are optional and when used, may be local to the hardware component or remote from it, but nevertheless operate as described herein. Additionally, an aggregation unit may be utilized in the absence of a log unit and a log unit may be utilized in the absence of an aggregation unit.

For example, the aggregation units 430 or 431 may provide algorithmic access to log units. In one embodiment, each aggregation unit 430 or 431 sends information to a central control point 444 which indicates that corrective action needs to occur, such as interrupt control flow and what action to take to handle the error. Aggregation unit 430 or 431 provides indication and optionally relationship between error events from various units of who did what and when (e.g., what hardware component had what error and associated state for the detected error).

Use of the aggregation units 430 or 431 negates the need to read multiple log units as high level data may be obtained from only a query to the aggregation unit 430 or 431. The log unit makes a control point aware of the error by passing the highest severity signal to the aggregation unit 430 or 431. The regional aggregation unit 431 makes no judgment regarding what is the most important among multiple received signals, instead, it merely collects signals from, for example, log 0 and from log 1, and drives these signals out to the control point 444 of an interfaced system. The aggregation unit may optionally be used to conduct some processing, such as filtering and/or prioritization.

In accordance with one embodiment, the design of the aggregation unit enables a hardware or software agent or control point 444 to determine what the address is of the log unit (e.g., register addresses 433) that generated the information. For example, a group of bits in the aggregation unit 430 or 431 corresponds to a log unit 432. In one embodiment, a block of four bits represents a particular log unit 432 and thus provides a reverse path from the aggregation unit 430 or 431 to a specific log unit 432 such that additional information can be retrieved from the identified log unit 432 if necessary.

The design of the aggregation unit 430 or 431 further enables a hardware or software agent or control point 444 to determine which aggregation units have information in them, and where that information is stored. Aggregation units hold the current signal 411 from each log unit 432, as well as another bit that indicates whether the identified log unit is the very first one for which an error among the various log units 432 for which aggregation is performed. The first arrived bit aids in understanding what event or what error, triggered the various cascade of events. In an alternative embodiment, a higher resolution indicator may be utilized, such as a portion of a timer value so that relative time between events could be made available.

In one embodiment, the regional aggregation unit 431 feeds the root aggregation unit 430. An aggregation root 455 indicates where to go and get next information when cascading aggregation units are utilized. Each aggregation unit collects the logs, condenses information (e.g., culls away all but the most severe signal received), and sends up condensed information to another aggregation unit, where available. In one embodiment, a combined signal is OR'd together and is sent to the root aggregator and based on the presence of the OR'd signal, a hardware or software agent or control point 444 can go and look in the individual aggregators if necessary. For example, if one log drives signal=x, and another log drives signal=y, the aggregation unit ORs them and drives out "x OR y" to the next aggregation unit or to the hardware or software agent or control point 444.

With reference again to FIG. 2, auxiliary units Aux0 214 and Aux1 217 are depicted. In accordance with one embodiment, at least one of the one or more hardware components 110 includes a log unit and an auxiliary unit 214 or 217 associated with the log unit. In such an embodiment, the log unit stores information regarding the detected error and the auxiliary unit 214 or 217 stores additional information regarding the detected error on behalf of the log unit 215 or 216.

With reference again to FIG. 4A, in one embodiment, the log unit 404 includes an auxiliary valid field 421 indicating whether the auxiliary unit 214 or 217 associated with the log unit 215 or 216 has the additional information stored therein and provides an indication to query the auxiliary unit 214 or 217 to retrieve the additional information. For example, the auxiliary unit may be implemented via a bit extension of the miscellaneous field of the log unit, both of which are optional. In one embodiment, the additional information stored in the auxiliary unit 214 or 217 includes at least one of: non-standardized information regarding the detected error which is not storable in a set of enumerated fields within the log unit 404, and address information which exceeds a register size or storage capability in the log unit 404. For example, a log unit 404 may be 64 bits long, but an address to be stored is 64 bits, thus causing insufficient room to store the address with the other required fields. The auxiliary unit 214 or 217 may be used to store the additional information, and to make the hardware and software agents more modular by providing for an auxiliary unit 214 or 217 for each instance of a log unit 404.

For example the auxiliary unit 214 or 217 may be utilized where the standard format cannot hold everything that may be applicable for a given unique error event, and thus, the auxiliary unit 214 or 217 associated with a log unit 404 can store and update additional information within the auxiliary unit 214 or 217. The additional information stored in the auxiliary unit 214 or 217 may vary from one hardware component to the next, but the presence of the AUX valid field 421 tells a hardware or software agent or control point 444 to query the auxiliary unit 214 or 217 and implement a mechanism to update the auxiliary unit 214 or 217.

Implementation of the standardized format within the log units allows for a more "data" centric processing approach rather than "pre-knowledge" centric processing, which enables modular and type agnostic error reporting and collection. The proposed organization additionally places more important (aggregation and event log) information earlier in the space than optional information (configuration and seed).

A control point 444 interfaced with the hardware component having the error framework embodied therein is enabled to take action and also to communicate in a standardized format with other software, such as to a hardware or software agent and also the operating system, responsive to signals from the hardware components. Efficiency for error communications is improved due to the standardization of the error information at the micro architecture level within the hardware components.

Hardware or software may extract log information and move it from the log unit and into a buffer, and then extract from buffer to consume. Conventional solutions suffered from log unit overflows, but using hardware or software to move logged data to a buffer can quickly clear out the log unit so that overflows are avoided. Additionally, data within the buffers can be modified to support legacy component expectations in terms of data format or to support different architectural expectations and requirements in terms of the data, thus enabling data spoofing and conversion as required. The buffer provides a mechanism to clear logs and avoid using the hardware logs as the primary store point, which may result in overruns and loss of data. Abstracting the logs may constitute simply copying the logs or in some cases may constitute copying the logs and performing data and format revisions to prepare the logs for the next software or hardware layer requiring the information.

Due to the standardization of the log unit, it is not necessary to have pre-knowledge of what type of hardware component generated data or what kind of data is being generated. Hardware and software agents may thus be wholly abstracted and can pull the appropriate information, enabling the logs and collection schemes to be context agnostic.

Figure 5:
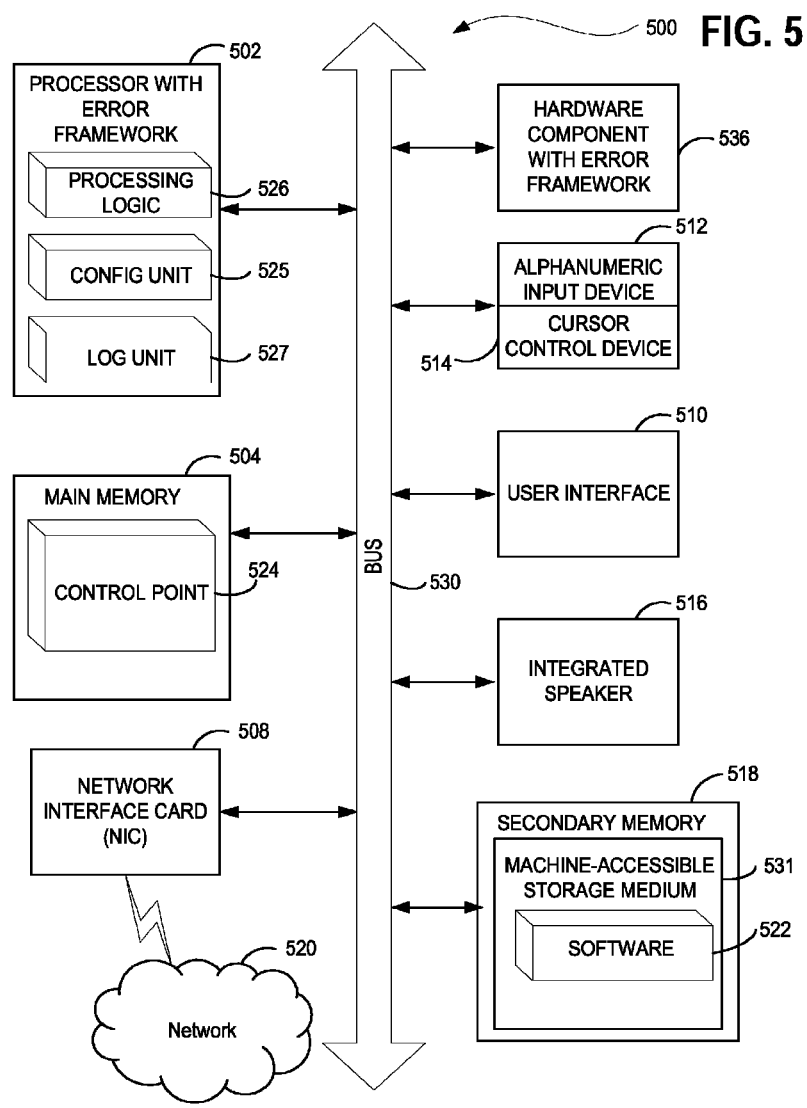
FIG. 5 illustrates a diagrammatic representation of a machine in the exemplary form of a computer system, in accordance with one embodiment.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a smart phone, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor with the error framework 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives), which communicate with each other via a bus 530. Main memory 504 includes a control point 524 to receive and handle software responses to detected errors for a hardware component such as processor 502 or the hardware component with the error framework 536. Processor 502 with the error framework therein operates in conjunction with the processing logic 526 to perform the methodologies discussed herein. In one embodiment processor 502 utilizes a configuration unit 525 and a log unit 527, each internal to the processor 502, to detect, capture, log, and coordinate response to errors.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device such as a hardware component with the error framework 536 (e.g., wireless or wired communication devices, memory devices, storage devices, audio processing devices, video processing devices, etc.).

The secondary memory 518 may include a non-transitory machine-readable or computer readable storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500. The software 522 may further be transmitted or received over a network 520 via the network interface card 508.

Figure 6:
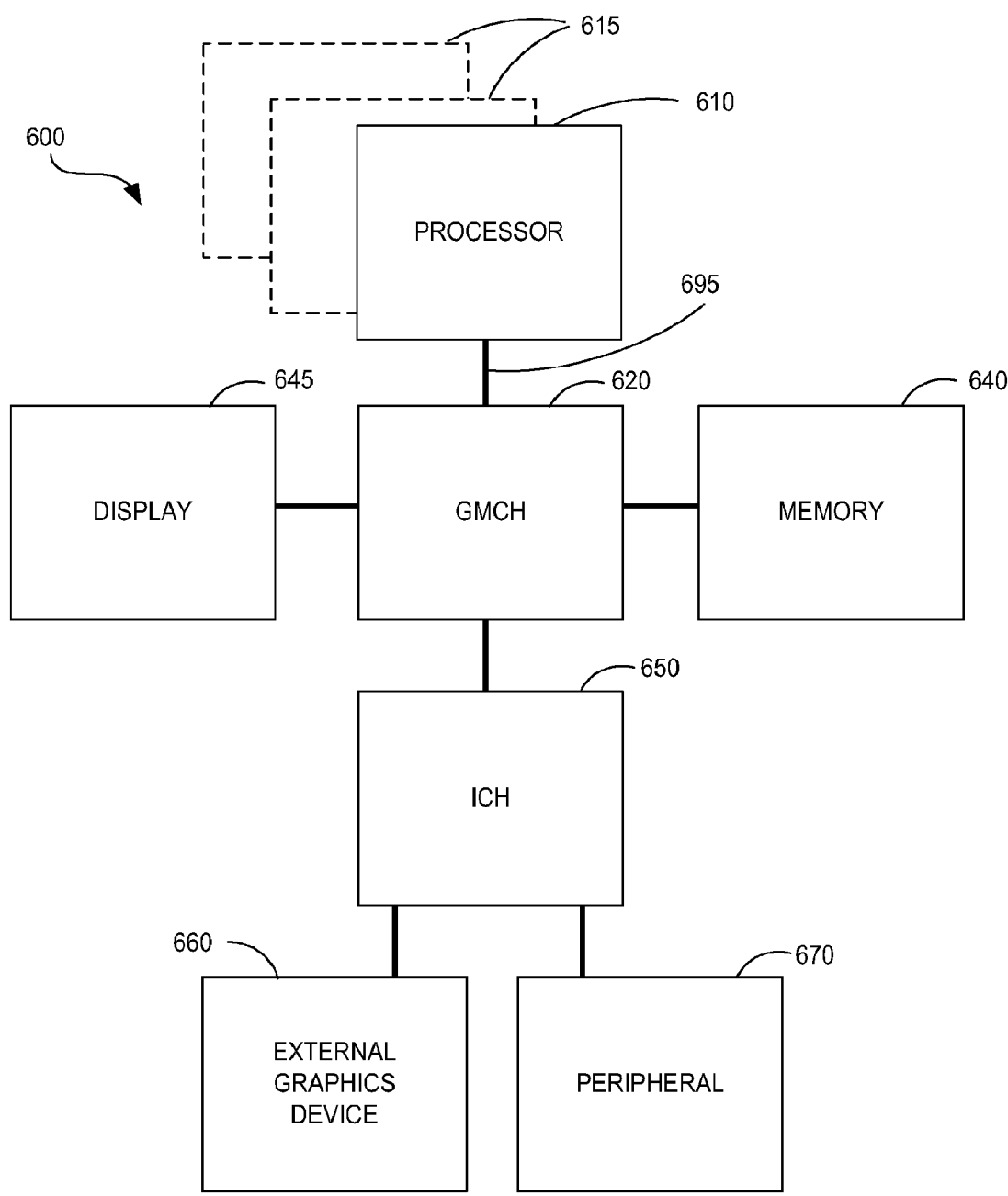
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the processor 502. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources of processors 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
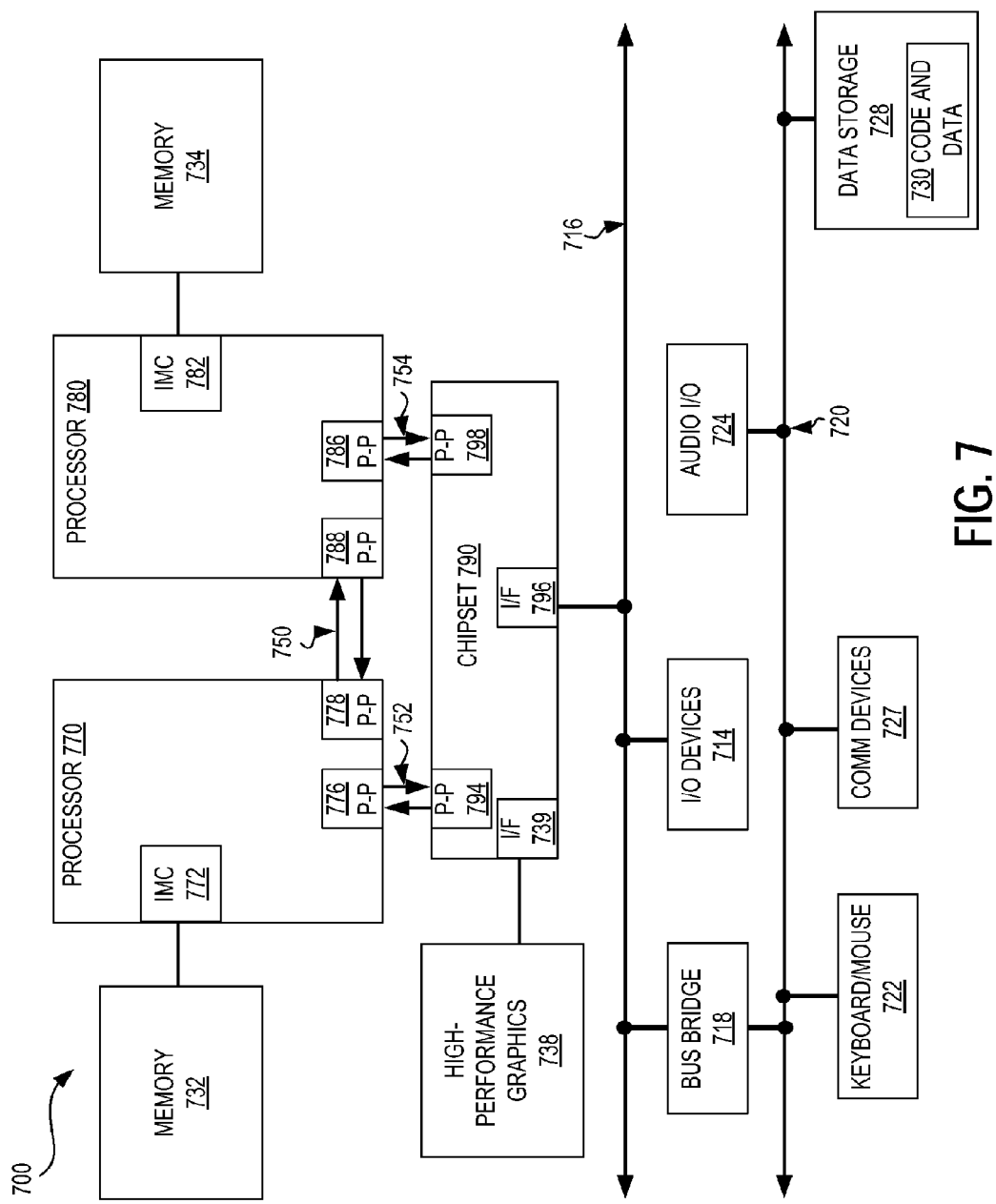
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 502 as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
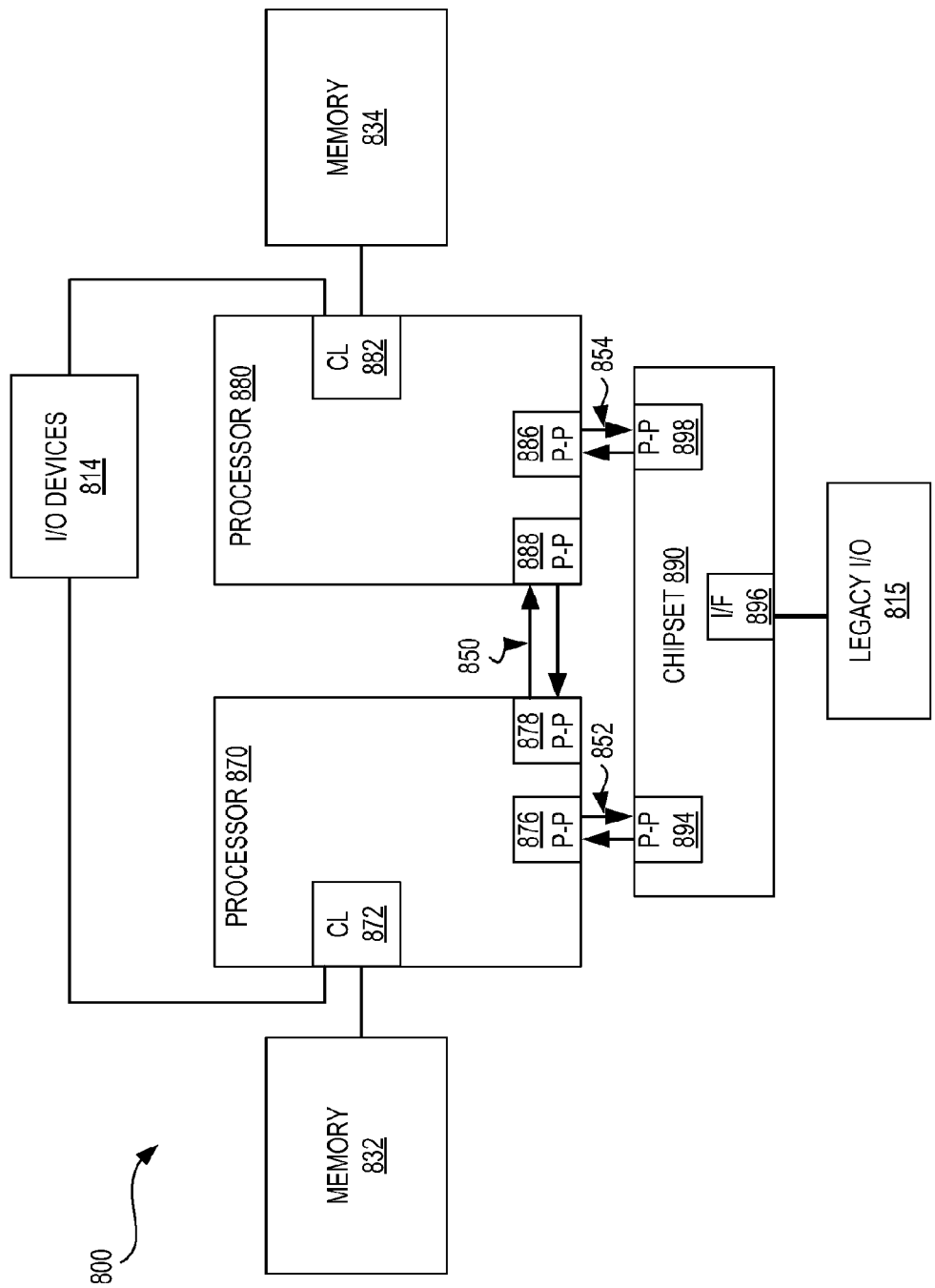
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
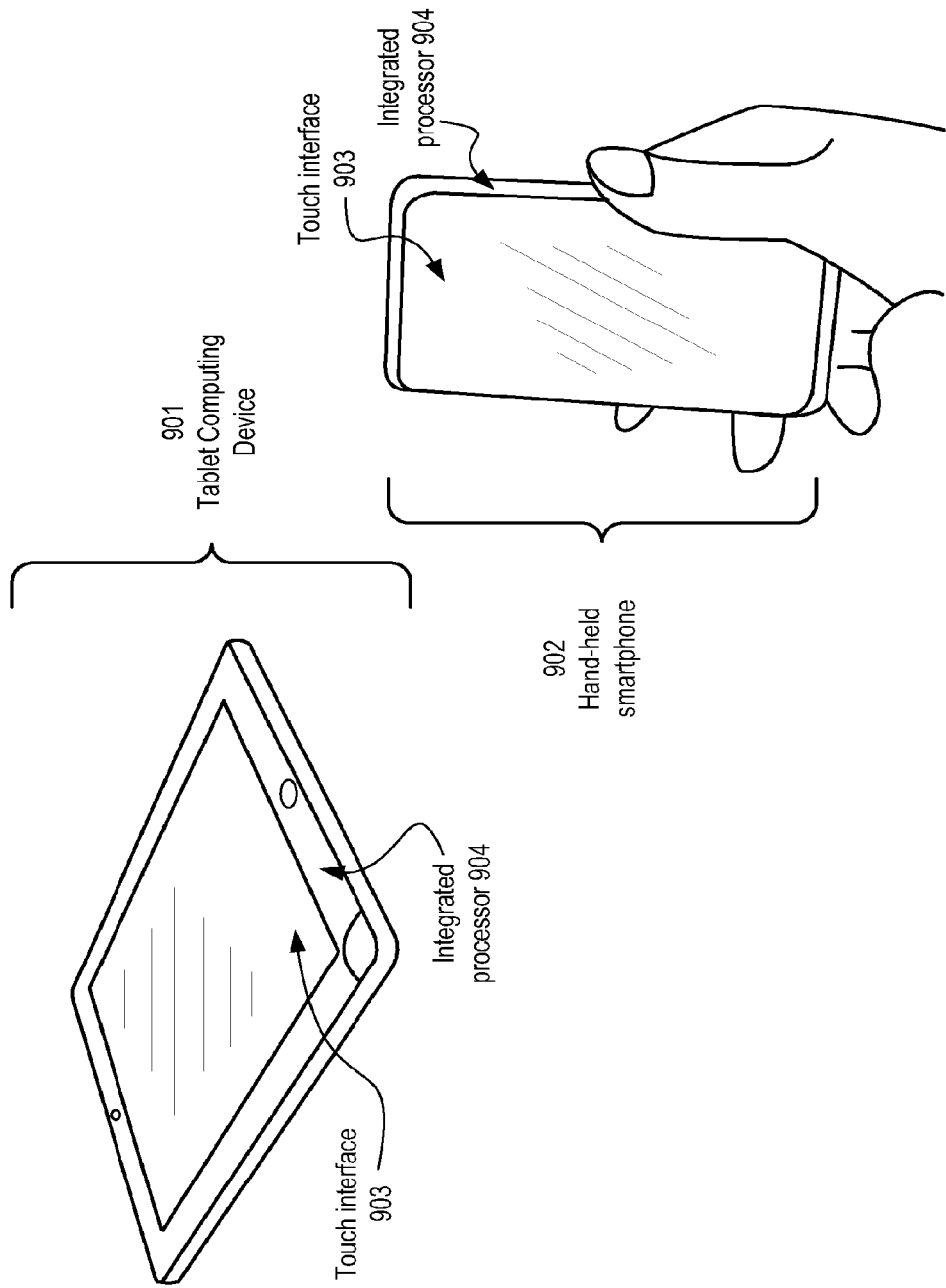
FIG. 9 depicts a tablet computing device and a hand-held smartphone each having a circuitry integrated therein as described in accordance with the embodiments.

FIG. 9 depicts a tablet computing device 901 and a hand-held smartphone 902 each having a circuitry integrated therein as described in accordance with the embodiments. As depicted, each of the tablet computing device 901 and the hand-held smartphone 902 include a touch interface 903 and an integrated processor 904 in accordance with disclosed embodiments.

In one embodiment, the hardware component 110 is a microprocessor within a tablet computing device or a smart phone or one of a plurality of hardware components integrated as peripheral devices within the tablet computing device or a smart phone. For example, the integrated processor 904 of a tablet computing device 901 or a hand-held smartphone 902 may implement the error framework as described herein.

Figure 10:
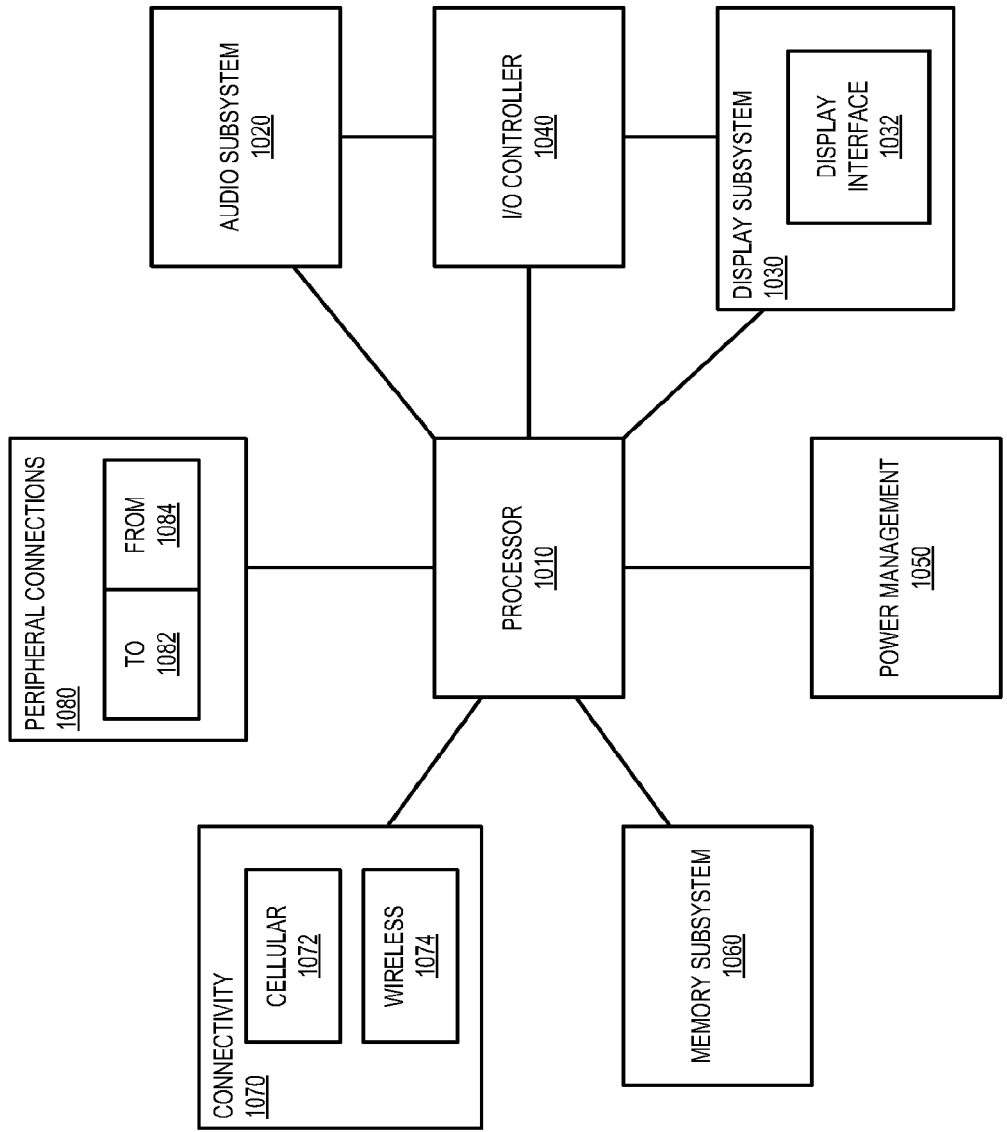
FIG. 10 is a block diagram of an embodiment of tablet computing device, a smart phone, or other mobile device in which touchscreen interface connectors are used.

FIG. 10 is a block diagram 1000 of an embodiment of tablet computing device, a smart phone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 1010.

Display subsystem 1030 represents hardware (e.g., display devices) and software (e.g., drivers) components that provide a visual and/or tactile display for a user to interact with the tablet computing device or smart phone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smart phone through which a user might interact. In one embodiment, I/O controller 1040 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 1050 that manages battery power usage, charging of the battery, and features related to power saving operation. Memory subsystem 1060 includes memory devices for storing information in the tablet computing device or smart phone. Connectivity 1070 includes hardware devices (e.g., wireless and/or wired connectors and communication hardware) and software components (e.g., drivers, protocol stacks) to the tablet computing device or smart phone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smart phone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
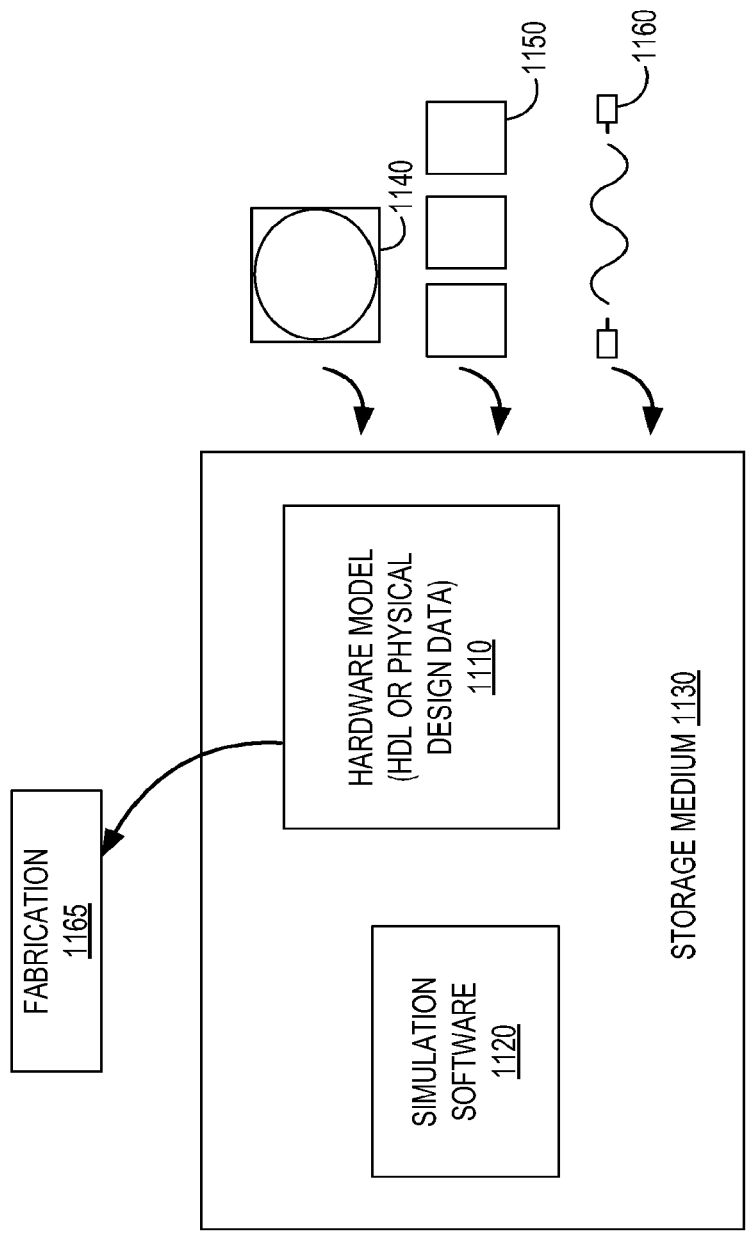
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
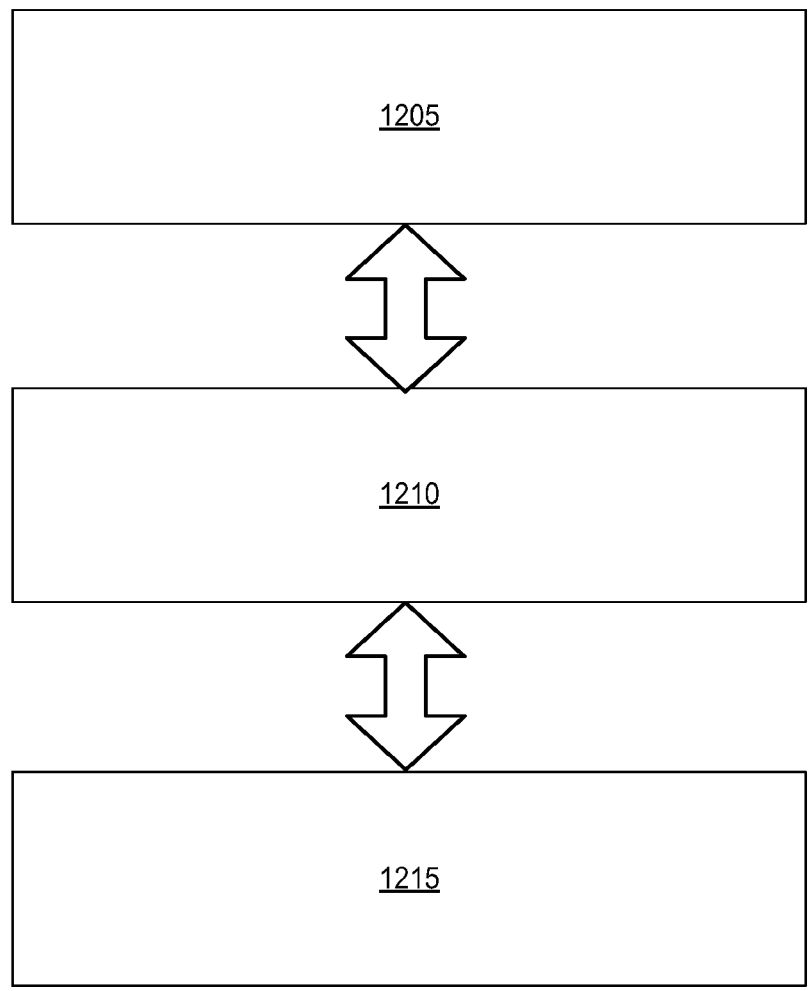
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
one or more hardware components, each having an error framework comprising:
an error detection unit to capture an error within the hardware component;
a state detection unit to capture error context information when the error is detected within the hardware component;
an error event definition unit to define a unique error event representing a combination of the error and the error context information; and
a configuration unit to define an error event response based on the unique error event,
wherein:
the configuration unit to further assign a severity to the defined unique error event based on the combination of the error and the error context information represented by the unique error event,
each of the one or more hardware components further includes a log unit,
the configuration unit to communicate the severity embodying the unique error event to the log unit,
the log unit to store the severity sufficient to uniquely identify the unique error event and the severity of the unique error event, the log unit stores three tiers of error data, the three tiers comprising:
a first tier of error data representing a count of errors logged since the log unit was cleared or a time indication, either relative or absolute, since the log unit was updated,
a second tier of error data representing information lost corresponding to a unique error event superseded by another unique error event in the log unit, and
a third tier of error data corresponding to a highest severity unique error event received by the log unit, the third tier of error data including at least a severity for the unique error event, an event identifier for the unique error event and one or more optional fields associated with the highest severity unique error event received by the log unit including a signal for the unique error event, a structure identifier, a port, a way, an entry and/or set, a thread, a miscellaneous field, a firmware field, and an auxiliary valid field indicating whether non-standardized miscellaneous data is available for the highest severity unique error event received by the log unit.

2. The system of claim 1, wherein the error context information comprises a known state of the system within a range of cycles during which the error occurs or a known state of the hardware component within which the error is detected during the range of cycles in which the error occurs.

3. The system of claim 2, wherein the known state of the system or the known state of the hardware component comprises at least one of:
the error occurring within a specified range of cycles;
the error occurring during an allocation operation;
the error occurring during a read operation;
the error occurring during a write operation;
the error occurring before a retry;
the error occurring after one or more retries;
the error occurring during a read operation to an uncorrectable data error for which no alternative copies exist;
the error occurring during a read operation to an uncorrectable data error for which at least one alternative copy exists;
the error occurring during a read operation to a parity correctable data error;
the error occurring during an allocation operation before a flush attempt;
the error occurring during an allocation operation after one or more flush attempts;
the error occurring during an allocation operation for which an alternative allocation address exists;
the error occurring during an allocation operation for which no alternative allocation address exists;
an instruction privilege at the time of the error;
an access type at the time of the error;
activity of older and/or younger instructions/requests at the time of the error;
the error occurring coincident, before or after another similar accesses of either a read or a write access type;
the error occurring coincident, before or after activity in another functional unit that is affected by or affects an operation experiencing the error;
the error occurring before, during, or after a translation operation;
the error occurring before, during, or after an allocation, a read, a write, a replay, a retry, a flush;
the error occurring before, during, or after processing of a speculative operation, a privileged operation, a mode change operation;
the error occurring before during or after the hardware component is able to processes additional operations;
the error occurring at a point requiring the hardware component to wait before continuing processing;
the error occurring in association with various architectural semantics of the system;
the error occurring based on environment factors including voltage, frequency, temperature, or a combination thereof;
the error occurring in association with manufacturing process for the device or system;
the error occurring in association with the age of the device or system;
the error occurring based on an availability of redundant resources or functional units within communicably interfaced with or within the system; and
the error occurring based on a state of another functional unit not including the hardware component.

4. The system of claim 1:
wherein the error event definition unit to define a plurality of unique error events, each of the plurality of unique error events corresponding to a unique combination of the detected error and the associated error context information for the detected error; and
wherein each detected error corresponds to multiple unique error events based on which one of a plurality of multiple distinct known states the system or the hardware component is operating at the time the error occurs.

5. The system of claim 1, wherein the configuration unit to define an error event response based on the unique error event comprises the configuration unit to map the unique error event to a corresponding response for the error event.

6. The system of claim 5:
wherein the configuration unit to map the error associated with a first severity to a first response based on the combination of the error and the error context information represented by the unique error event; and
wherein the configuration unit to map the same error associated with a second severity, different than the first severity, to a second response, different than the first response, based on the combination of the error and the error context information represented by the unique error event.

7. The system of claim 5, wherein the corresponding response for the unique error event comprises at least one of:
enabling a hardware response for the error with no corresponding software response;
enabling the hardware response for the error with a complementary software response;
enabling a software response for the error and a notification to the system to implement the software response for the error, with or without a complimentary hardware response;
notifying the system of an uncorrected error, unrecoverable error, or fatal/catastrophic error within the hardware component within which the error is detected;
enabling a response handling operation selected from the group comprising: a retry; an abort; a correction; a propagation; an ignore; a continue; a reconfiguration instruction; an instruction to a functional unit; canonization; a change to resources of the system; and a change to an execution path; and
wherein enabling the hardware response or the software response or both for the error includes at least one of: an instruction to correct, contain, abort, retry, ignore, halt, or disable responses to the error.

8. The system of claim 5, wherein the configuration unit to cause enablement of a software response to the error or enablement of a hardware response to the error, or the enablement of both the hardware response and the software response to the error, based on a threshold counter.

9. The system of claim 1:
wherein the configuration unit to further communicate the defined unique error event to an enable hardware response unit, wherein the enable hardware response unit to perform one of the following operations:
(a) the enable hardware response unit declines to enable a hardware response; and
(b) the enable hardware response unit enables the hardware response to the error based on the unique error event and passes the hardware response to the hardware component for consumption by the hardware component; and
(c) the enable hardware response unit enables the hardware response to the error based on the unique error event and passes the hardware response to another hardware component not including the hardware component within which the error is detected.

10. The system of claim 9, wherein the configuration unit to further communicate the defined unique error event to an enable hardware response unit within the hardware component within which the error is detected or communicably interfaced with the hardware component within which the error is detected; and
wherein the enable hardware response unit alters the state of the system or alters the behavior of the system responsive to the error by altering the environment or conditions of the system through a change to at least one of frequency, voltage, temperature, or a combination thereof.

11. The system of claim 1:
wherein the log unit implements a clearing interlock mechanism via a count field;
wherein the count field stores a count of errors logged since the log unit was cleared;
wherein the count field is incremented every time a new severity is received, regardless of whether or not the new severity is sufficiently high to be stored by the log unit as a highest severity unique error event or as a next highest severity unique error event for which a lost severity is stored by the log unit;
wherein the count field is read before initiating a clear of the log unit; and
wherein the count field is cleared when a current count field value corresponds to the previously read count field value;
wherein the log unit is not cleared when the current count field value is different than the previously read count field value.

12. The system of claim 1:
wherein the log unit implements a clearing interlock mechanism via a time field which changes with each error event;
wherein the time field stores a time since the log unit was cleared or a time that the log unit was cleared or a time since the last error event or a time of the last error event;
wherein the time field is read before initiating a clear of the log unit; and
wherein the log unit is not cleared when a current value of the time field is different than expected.

13. The system of claim 1, wherein at least one of the one or more hardware components further includes a seed unit, wherein the seed unit to perform test error event injection by writing a test error event into the hardware component having the seed unit to trigger error detection by the error framework for the hardware component.

14. The system of claim 13:
wherein the error detection unit to capture an error responsive to the error test event;
wherein the state detection unit to capture error context information for the system or the hardware component responsive to detecting the error associated with the error test event;
wherein the error event definition unit to define a unique error event representing a combination of the error corresponding to the error test event and the captured error context information; and
a configuration unit to define an error event response based on the unique error event defined responsive to the error test event.

15. The system of claim 1, further comprising a control point, wherein the control point to perform at least one of the following actions:
initiate actions responsive to information received from an aggregation unit associated with the error framework;
communicate an event error response or a software response, or both, to a communicably interfaced operating system;
communicate an event error response or a software response, or both, to a communicably interfaced hardware and/or software agents;

extract information from one or more log units for buffering;

extract information from one or more log units for abstraction;

clearing information from one or more log units;

performing a standardized log retrieval operation without regard to a type or identity of a hardware component having generated information for one or more log units;

abstracting information from one or more log units and altering the abstracted information from the one or more log units to match an expected format of an entity to consume the abstracted information; and tracing a reverse path from an aggregation unit to a log unit to retrieve information stored in the log unit and additional information stored in an auxiliary unit when available.

16. A hardware component to be integrated into a computing system, wherein the hardware component implements an error framework comprising:

an error detection unit to capture an error within the hardware component;

a state detection unit to capture error context information when the error is detected within the hardware component;

an error event definition unit to define a unique error event representing a combination of the error and the error context information; and a configuration unit to define an error event response based on the unique error event wherein the hardware component further includes one or more log units and an aggregation unit;

wherein the configuration unit to further assign a severity to each of one or more defined unique error events and communicate the assigned severity representing each of the one or more defined unique error events to the one or more log units;

wherein the aggregation unit stores a highest assigned severity from each of the one or more log units;

wherein the aggregation unit passes the received severity or an abstracted version of severity to a control point of the system for handling the detected error;

wherein the aggregation unit provides context of which of the one or more log units is storing a detected error and a reverse path to a corresponding log unit for each detected error within the aggregation unit, wherein the reverse path provides access to additional error information stored within the corresponding log unit for each detected error; and wherein the aggregation unit further indicates a time stamp for each of a plurality of detected errors.

17. A system comprising:

one or more hardware components, each having an error framework comprising:

an error detection unit to capture an error within the hardware component;

a state detection unit to capture error context information when the error is detected within the hardware component;

an error event definition unit to define a unique error event representing a combination of the error and the error context information; and a configuration unit to define an error event response based on the unique error event, wherein:

at least one of the one or more hardware components further includes a log unit and an auxiliary unit associated with the log unit, the log unit stores information regarding the detected error, the auxiliary unit stores additional information regarding the detected error on behalf of the log unit, and the log unit comprises an auxiliary valid field indicating whether the auxiliary unit associated with the log unit has the additional information stored therein and an indication to query the auxiliary unit to retrieve the additional information, and the additional information stored in the auxiliary unit comprises at least one of:

non-standardized information regarding the detected error which is not storable in a set of enumerated fields within the log unit, and address information which exceeds a register size or storage size of the log unit.

* * * * *